United States Patent [19]

Coreth

[11] 4,329,076
[45] May 11, 1982

[54] TELESCOPING TUBES WITH A TWIST LOCKING ARRANGEMENT

[75] Inventor: Alois Coreth, Fort Lee, N.J.

[73] Assignee: Lapides Corporation, Paterson, N.J.

[21] Appl. No.: 180,117

[22] Filed: Aug. 21, 1980

[51] Int. Cl.³ .............................................. F16B 7/10
[52] U.S. Cl. .................................... 403/109; 403/343
[58] Field of Search ............... 403/109, 104, 112, 343, 403/344; 285/178, 314, 424, 302

[56] References Cited

U.S. PATENT DOCUMENTS

| | | | |
|---|---|---|---|
| 958,752 | 5/1910 | Mackensen | 285/302 |
| 982,836 | 1/1911 | HiPiLey et al. | 285/302 |
| 2,289,818 | 7/1942 | Winner et al. | 403/109 X |
| 2,537,284 | 1/1951 | Schuder | 285/424 X |
| 2,685,460 | 8/1954 | Ogborn et al. | 403/109 X |
| 2,851,288 | 9/1958 | Kinkead | 285/314 |
| 2,949,692 | 8/1960 | Kuhn | 285/178 X |
| 3,413,021 | 11/1968 | Potts | 285/424 X |
| 4,076,437 | 2/1978 | Mazzolla | 403/109 X |

*Primary Examiner*—Wayne L. Shedd
*Attorney, Agent, or Firm*—Friedman, Goodman & Teitelbaum

[57] ABSTRACT

A locking arrangement for telescoping tubes including an outer elongated tube with a radially inwardly projecting lock seam longitudinally extending along the length of the tube, and an inner elongated tube telescopically being received within the outer tube. The inner tube includes at least one integral radially outwardly extending projection formed as a deformation of the wall of the inner tube. The projection is such as to be able to be arranged in a clearance fit relationship so as to permit axial sliding of the tubes relative to each other, and upon relative rotation of the tubes, to adjust the projection in an interference fit whereby the inner tube becomes eccentric with the outer tube and is jammed in a locked position within the outer tube.

8 Claims, 5 Drawing Figures

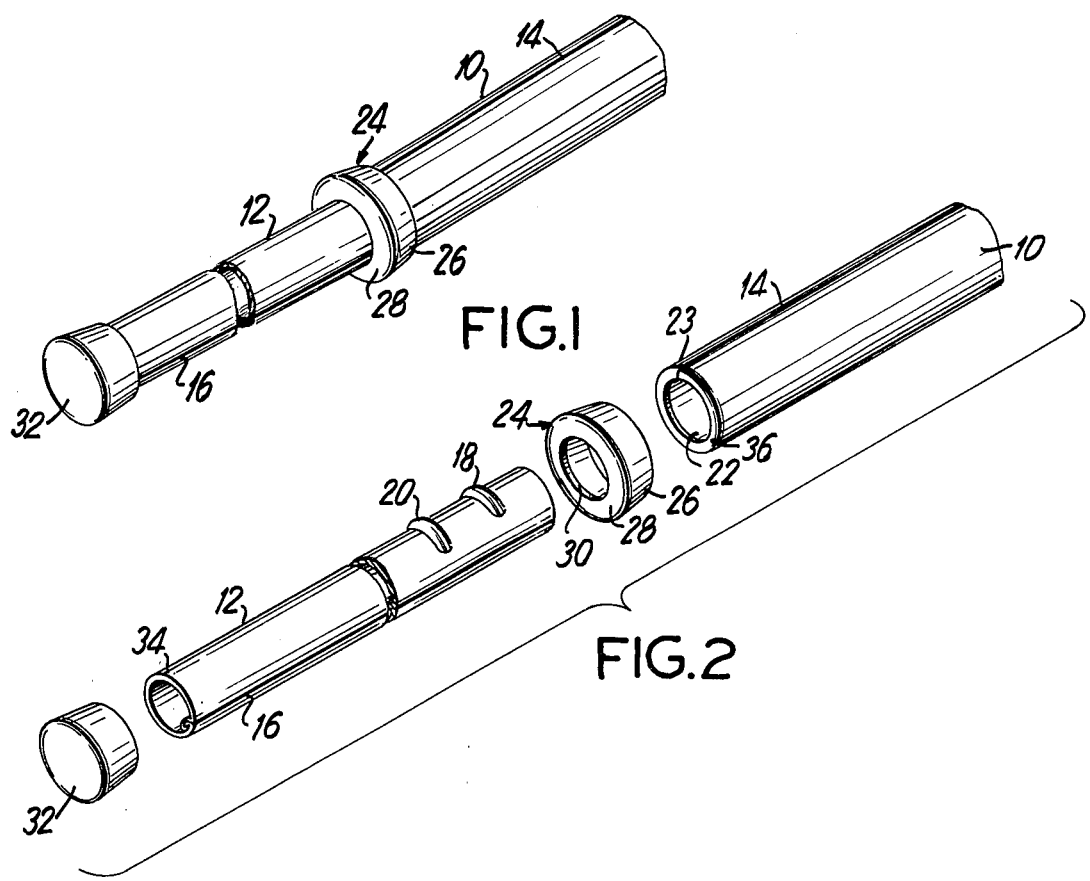
FIG.1
FIG.2
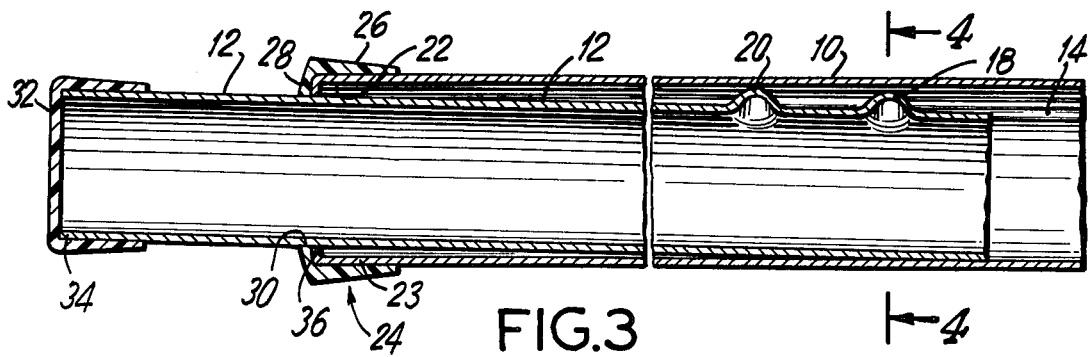
FIG.3
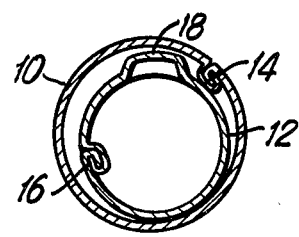
FIG.4
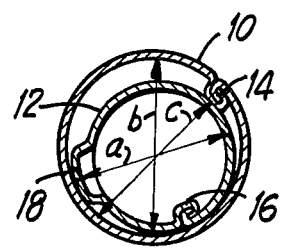
FIG.5

TELESCOPING TUBES WITH A TWIST LOCKING ARRANGEMENT

BACKGROUND OF THE INVENTION

This invention relates to adjustable telescopic connections, and more particularly to an integral twist lock arrangement for telescoping tubes.

Axially adjustable telescoping tubes are regularly utilized to provide a desired axial length. The difficulty generally arises when providing a suitable arrangement for locking the telescoping tubes at the desired axial position so as to prevent further sliding therebetween. Numerous types of locking arrangements have been heretofore provided in the prior art. However, none of them have provided sufficient ease of utilization and at the same time minimal cost and avoidance of complex manufacturing steps.

By way of example, U.S. Pat. No. 958,752 describes telescoping tubes with the outer tube provided at its end with an eccentric lip and the inner tube is provided at its end with an eccentric annular body. The eccentric annular body is movable with the inner tube within the outer tube. Once the desired axial position is arranged, the inner tube is rotated along with the annular body to provide a jamming position between the inner and outer tubes.

One of the problems with this prior art arrangement is that the strength of the jamming arrangement varies with the amount of telescopic overlap. Also, at the location where the annular body is jammed, there is only one bearing contact between the inner and outer surfaces so that the inner tube will be considerably bent. Additionally, it is necessary to provide a separate annular body, such as a sleeve or ring, around the inner tube which requires additional manufacturing steps and adds to the cost of the arrangement.

Another locking arrangement is described in U.S. Pat. No. 2,871,044 which includes side wedges forming eccentric surfaces on the inner tube. A roller is caused to climb onto one of these eccentric surfaces to effect a tightening of the inner and outer tubes. The roller is held in place by a covering sleeve over the outer tube. This arrangement requires additional parts, extensive manufacturing steps, and only permits limited axial sliding between the tubes.

A further arrangement for locking telescoping tubes is provided in U.S. Pat. No. 642,193 which requires a spiral groove of a varied depth in conjunction with a spiral key which rides within the groove. U.S. Pat. No. 3,419,293 utilizes a cylindrical plug with an eccentric portion and a complex collar arrangement for engaging the eccentric plug. Similarly, U.S. Pat. No. 4,195,346 utilized an eccentric plug, which is engaged between the inner and outer tubes and requires two additional sleeves for operating the locking arrangement.

It is accordingly noted that although prior art locking arrangements have been provided for telescoping tubes, most of these arrangements required additional parts, complex manufacturing steps, and provided for difficult manipulations in order to achieve secure locking between the telescoping parts.

SUMMARY OF THE INVENTION

It is accordingly an object of the present invention to provide a locking arrangement for telescoping tubes which avoids the aforementioned problems of prior art arrangements.

Yet another object of the present invention is to provide a simple twist lock arrangement for telescoping tubes.

Still another object of the present invention is to provide a twist lock arrangement which is integral with telescoping tubes and requires no additional parts.

Yet another object of the present invention is to provide a locking arrangement for telescoping tubes utilizing a lock seam inherently included in the outer tube and an integral projection provided on the inner tube.

Briefly, in accordance with the present invention, there is provided a locking arrangement for telescoping tubes, including an outer elongated tube which telescopically receives an inner elongated tube. A radially inwardly projecting lock seam longitudinally extends along the length of the outer tube. On the inner tube there is formed at least one radially outwardly extending projection which is integrally formed on the inner tube as a deformation of the wall of the inner tube. The diametric distance of the inner tube measured at the portion including the projection, is greater than the diametric distance of the outer tube measured at the lock seam portion and is less than the diametric distance of the outer tube measured at a portion other than at the lock seam portion. In this manner, the tubes can be arranged in a clearance fit relationship and thereby slidably adjusted to a desired axial relative position. Once the desired axial position is achieved, the tubes can be relatively rotated so that the projection is displaced in a direction angularly away from the lock seam such that the inner tube becomes eccentric with respect to the outer tube and the tubes are arranged in a interference fit relationship.

BRIEF DESCRIPTION OF THE DRAWINGS

With the above and additional objects and advantages in view, as will hereinafter appear, this invention comprises the devices, combinations and arrangements of parts hereinafter described by way of example and illustrated in the accompanying drawings of a preferred embodiment in which:

FIG. 1 is a perspective view of the telescopically arranged tubes;

FIG. 2 is an exploded perspective view of the various parts of the locking telescopic arrangement of the present invention;

FIG. 3 is a cross sectional elevational view showing the lock telescopic tubes;

FIG. 4 is a cross sectional view taken along lines 4—4 and showing the relative position of the tubes when the tubes are in a sliding position wherein there is a clearance fit arrangement therebetween; and FIG. 5 is a cross sectional view also taken along lines 4—4 and showing the relative position of the tubes in a locked position wherein there is an interference fit arrangement therebetween.

In the various figures of the drawing, like reference characters designate like parts.

DETAILED DESCRIPTION OF THE PREFERRED EMBODIMENT

Referring now to FIGS. 1-3, the present invention comprises a pair of telescopically arranged tubes including an outer tube 10 which telescopically receives an inner tube 12. The outer tube 10 is formed of a flat sheet material which is rolled with the ends coupled together by means of a radially inwardly projecting lock seam 14 which longitudinally extends along the length of the tube 10. The inner tube 12 is similarly formed and also includes a radially inwardly projecting lock seam 16 which longitudinally extends along the length of the tube 12.

The inner tube 12 also includes at least one radially outwardly extending projection 18 which is integral with the inner tube and is formed as a deformation of the wall of the inner tube. A second such projection 20 is also shown and is axially spaced apart from the first projection 18. The two projections are shown as being coaxial with each other. Additionally, the projections 18, 20 are angularly positioned with respect to the lock seam 16, and are preferably positioned on an end portion of the inner tube 12.

The two tubes 10, 12 are assembled with the tube 12 extending out of the telescopically receiving opening 22 at the end 23 of the outer tube 10. The tubes can then be telescopically adjusted at a desired axial position. The assembled position can be noted in FIG. 3.

The relative diametric distances of the inner and outer tubes can best be seen in FIG. 5 where the diametric distance of the inner tube 12 measured at the projection is noted by the arrow "a". The diameter of the outer tube 10 measured at a point other than the location of the lock seam is denoted by the arrow "b" and the diametric distance of the outer tube 10 at the location of the lock seam 14 is denoted by the arrow "c". The distance "a" is less than the distance "b" and greater than the distance "c". With the arrangement as shown, the inner tube can be inserted into the outer tube with the projection 18 at a slight angular distance, for example approximately 45°, from the lock seam 14 on the outer tube 10. This arrangement, as shown in FIG. 4, provides for a clearance fit relationship between the inner and outer tubes.

The inner tube 12 can then be rotated whereby the projection 18 is angularly spaced a greater distance from the lock seam 14, and closer to a 90° distance therefrom, whereby an interference fit relationship is provided therebetween, as shown in FIG. 5. At this angular relative position, the projection 18 causes the inner tube 12 to be eccentrically located with respect to the outer tube and provides a camming or wedging action to jam the inner tube 12 inside the outer tube 10.

Accordingly, referring now to FIG. 4, the inner tube 12 is initially inserted in the outer tube 10 with the projection 18 at a slight angular distance from the lock seam 14 of the outer tube 10. In this relative angular position, the two tubes are substantially concentric and a clearance fit is provided for the projection whereby the inner and outer tubes can be relatively slid to a desired relative axial position to obtain a selected combined length for the two tubes.

When the relative axial position is achieved, the tubes are relatively rotated so that the projection 18 is displaced in a direction angularly further away from the lock seam 14 of the outer tube 10 so that the inner tube 12 becomes eccentric with respect to the outer tube and the projection 18 is wedged in to provide a jamming of the inner tube within the outer tube. In this way, the two tubes are locked together as a result of the twisting action to maintain the selected combined length of the two tubes.

In order to close off the annular space between the telescopically receiving end 23 of the outer tube 10 and the inner tube, and to provide a finished appearance, an annular collar 24 can be included. The collar 24 has a cylindrical side wall 26 which fits over the telescopically receiving end 23 of the outer tube 10. A radially inwardly directed annular end wall 28 perpendicularly extends from the side wall 26 and includes an opening 30 of approximately the size of the inner tube 12. Thus, the collar 24 finishes off the interconnecting parts between the telescopically arranged tubes.

An end cap 32 can also be provided which can be placed at the distal end 34 of the inner tube 12 to close it off and seal it. This arrangement is well suited where the tubes are used as legs and the end cap 32 will serve as the base or foot of the telescopically arranged leg.

In order to prevent removal of the inner tube 12 through the opening 22 of the outer tube 10, the edge of the end 23 of the outer tube 10 at the telescopically receiving opening 22 can be radially inwardly bent to provide a flange 36 so as to reduce the opening 22 to a size large enough to receive the diameter portion of the inner tube but smaller than the distance "a" taken at the projection. In this way, while the inner tube will slide through the reduced size opening 22 of the outer tube, the projections 18, 20 will not be able to pass outwardly of the outer tube.

The inward bending can be achieved after the two tubes have been assembled in order to prevent removal of the inner tube. Alternately, if the flange 36 of the outer tube is already formed, the inner tube can be inserted through the opposing end of the outer tube and passed through the outer tube and then out through the opening 22.

It should be appreciated that the twist lock arrangement provided between the telescoping tubes is such that it is integrally formed with the tubes themselves. Specifically, the lock seam which is an integral part of the outer tube is utilized, and the deformations 18, 20 are integrally formed on the inner tube. In this manner, no additional members are needed in order to provide the twist lock arrangement.

An additional benefit of the present arrangement is that at the point of locking, there are two bearing surfaces provided between the inner and outer tubes. Specifically, the projection 18 or 20 of the inner tube 12 bears against the outer tube, and the lock seam 14 of the outer tube 10 bears against the inner tube. These two bearing points are almost diametrically opposed to each other so that sufficient bearing pressure is formed against the inner tube.

It should further be noted that regardless of the relative axial position, the two bearing points will always be present since the lock seam 14 on the outer tube 10 extends the entire length of the tube and is therefore always present at the point where the projections 18, 20 will be jammed against the outer tube.

The purpose of having two projections 18, 20, is to provide increasing jamming action. Additional projections could also be provided. However, even one projection is sufficient to provide the locking arrangement between the tubes.

If additional sections of a telescoping arrangement is required, projections can also be formed on the outer tube 10 at the opposite end thereof so that the outer tube 10 can then be telescopically received within another larger similar tube and can be locked thereto in the same manner as set forth above.

Numerous alterations of the structure herein disclosed will suggest themselves to those skilled in the art. However, it is to be understood that the present disclosure relates to a preferred embodiment of the invention which is for purposes of illustration only and is not to be construed as a limitation of the invention.

What is claimed is:

1. Locking telescoping tubes, comprising:
    an outer elongated tube having a radially inwardly projecting lock seam longitudinally extending along the length of said outer tube;
    an inner elongated tube telescopically received within said outer tube through a telescopically receiving opening of said outer tube;
    said inner tube including at least one integral radially outwardly extending projection provided as a deformation of a wall portion of said inner tube;
    a first diametric distance of said inner tube at said projection being greater than a second diametric distance of said outer tube measured at said lock seam and less than a third diametric distance of said outer tube measured at a position other than at said lock seam;
    whereby said outer and inner tubes can be telescopically arranged in a clearance fit relationship to be adjusted at a desired relative axial position and then relatively rotated so that said projection is displaced in a direction angularly away from said lock seam such that said inner tube becomes eccentric with respect to said outer tube and said outer and inner tubes are arranged in an interference fit relationship.

2. Locking telescoping tubes as in claim 1 further comprising a radially inwardly directed flange at an end of said outer tube to reduce said telescopically receiving opening of said outer tube to a size less than said first diametric distance of said inner tube to prevent removal of said inner tube through said outer tube opening.

3. Locking telescoping tubes as in claim 1 further comprising a collar member for closing an annular space between said inner and outer tubes at said telescopically receiving opening of said outer tube.

4. Locking telescoping tubes as in claim 3, wherein said collar member includes a cylindrical side wall for fitting over an end portion of said outer tube, and a radially inwardly directed annular end wall perpendicular to said side wall of said collar member, said end wall of said collar member being provided with an opening proximating the diameter of said inner tube.

5. Locking telescoping tubes as in claim 1 further comprising an end cap for closing a distal end of said inner tube.

6. Locking telescoping tubes as in claim 1, wherein two substantially identical protrusions are provided on said inner tube axially spaced apart from each other.

7. Locking telescoping tubes as in claim 6, wherein said two projections are coaxial with each other.

8. Locking telescoping tubes as in claim 1, wherein said projection extends an angular distance about the periphery of said inner tube.

* * * * *